May 26, 1931.  H. L. FURR  1,807,285
SIGNAL SWITCH FOR MOTOR VEHICLES
Filed March 27, 1928
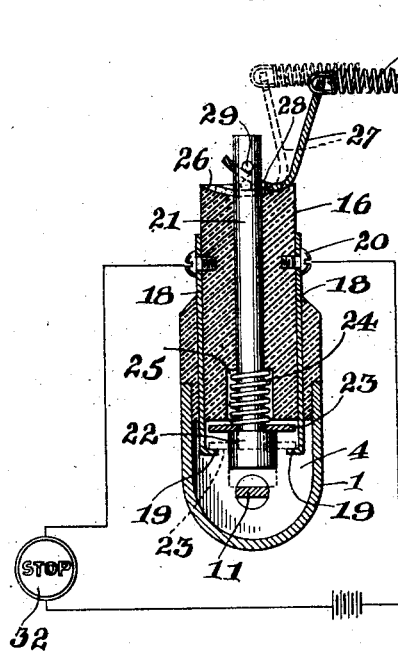
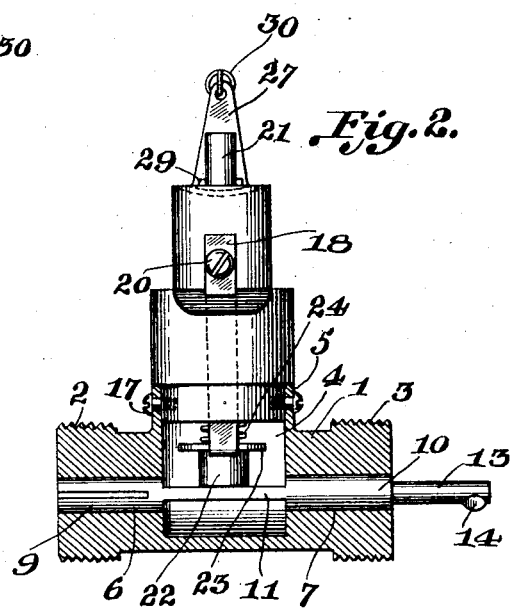
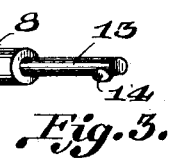
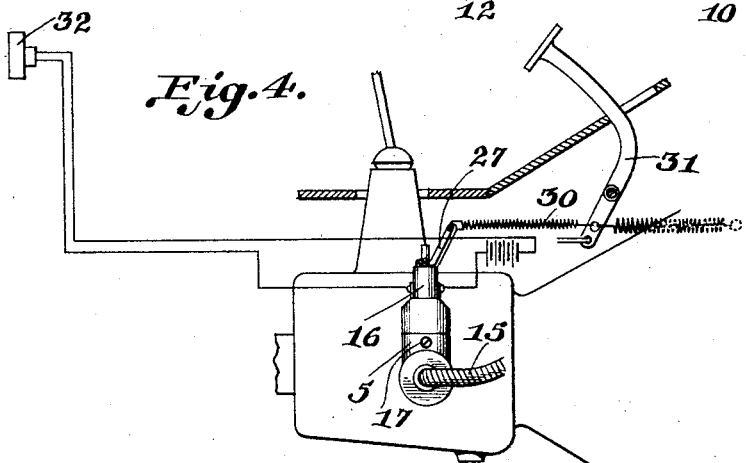
Inventor
Harry L. Furr
By Donald L. Mayson
Attorney Patented May 26, 1931

1,807,285

UNITED STATES PATENT OFFICE

HARRY L. FURR, OF WASHINGTON, DISTRICT OF COLUMBIA, ASSIGNOR, BY DIRECT AND MESNE ASSIGNMENTS, OF TWO PER CENT TO F. J. ELLSWORTH, AND FIVE PER CENT TO HERBERT W. STEIGEL, BOTH OF STAUNTON, VIRGINIA

SIGNAL SWITCH FOR MOTOR VEHICLES

Application filed March 27, 1928. Serial No. 265,050.

This invention relates to improvements in circuit makers and breakers, and more particularly to a cam operated switch mechanism which will be used in connection with a motor vehicle to operate a signal intermittently to warn drivers to the rear, of an intended stop or decrease in speed of the vehicle.

An object of the invention is to provide an improved switch mechanism which may readily be attached to the transmission casing of a motor vehicle, and connected between the gearing in said casing and the speedometer cable, whereby the mechanism is normally inoperative during movement of the vehicle, but is brought into intermittent operation when the foot brake is depressed, thereby causing the intermittent operation of a visual or audible signal connected with the said mechanism to give timely warning of an intended stop or decrease in speed of the vehicle.

A further object of the invention is to provide an improved switch mechanism which will be connected between the transmission gearing and the speedometer cable of a motor vehicle, and operable by a cam driven by the transmission speedometer gear to produce an intermittent operation of a visual or audible signal to warn of an intended stop or decrease in speed of the vehicle, said mechanism being normally held under tension to be inoperative, but capable of instant operation upon the depressing of the foot brake lever, or movement of any member connected with the brake mechanism to which the switch mechanism may be attached.

Other objects will appear as the description proceeds.

In the accompanying drawings which constitute a part of my application,

Figure 1 is a vertical sectional view of my improved switch mechanism, showing the same connected in a signal circuit;

Figure 2 is a side elevation, partly in section, taken at right angles to Figure 1;

Figure 3 is a perspective view of the cam link used to operate the switch mechanism, and Figure 4 is a diagrammatic view showing the invention applied to the transmission casing of a motor vehicle.

Like characters of reference are used throughout the following specification and the accompanying drawings to designate corresponding parts.

My improved switch mechanism comprises an enlongated body 1 which is externally threaded at its opposite ends at 2 and 3, and is provided with a centrally disposed well or chamber 4, the same terminating in an annular collar 5. The body 1 is further provided with a centrally disposed bore forming end bearing surfaces 6 and 7 for the cam operating link 8. The link 8 is formed with cylindrical end portions 9 and 10, which are adapted to be received within the bearings 6 and 7, and an intermediate cut-away cam portion 11 which is adapted to revolve or rotate transversely across the chamber 4 in the body 1. The end portion 9 of the link 8 is recessed and slotted as at 12 to receive the usual shaft extension and key connected with the speedometer shaft, while the opposite end of the link is formed with the shaft extension 13 and key 14 which will be connected with the transmission speedometer gear in the cable 15.

A switch housing 16 of non-conducting material is removably secured within the annular collar 5 on the body 1, by means of the set screws 17. Contact strips 18 are embedded within the housing 16 in spaced relation, and are inwardly bent at their inner extremities to form contact points 19, while their opposite ends are secured to the housing 16 by means of the screws 20, which will be connected in an electrical circuit with which a source of electrical energy and a signal operable thereby.

A reciprocable rod 21 is mounted within the housing 16, and is provided at its lower extremity with a cam-engaging head 22. A conducting ring 23 is mounted about the rod 21 and seats on the adjacent face of the head 22, and is held thereon under tension of the coil spring 24 about said rod 21. The spring 24 is positioned within the recess 25 in the housing 16. The upper surface of the housing 16 is concave as at 26, and cooperates with the curved operating lever 27 which is provided with an opening 28 through which the free end of the rod 21 is adapted to extend. A cross pin 29 extends through the rod 21, immediately above the lever 27 thereby providing bearing shoulders for the lever to lift against. A spring 30 will be attached to the free end of the lever 27 and to the brake lever 31, so that when the brake lever is in free or non-braking position, the rod 21 with the ring 23 will be raised away from the contact points 19 and out of engagement with the cam portion 11 of the link 8. The lever 27 is mounted to freely swivel about the rod 21.

From the foregoing description it will be apparent that the cam link will be rotated at all times when the vehicle is in motion, and that the circuit will be broken except when the foot brake is depressed. The action of depressing the foot lever, causes the rod 21 to drop so that the cam-engaging head 22 will contact with the cam portion 11 of the link 8, thereby intermittently closing and opening the circuit between the points 19 through the medium of the ring 23, which will cause the signal 32 to intermittently operate to warn drivers behind of an intended stop or decrease in speed. It will be seen that if the speed of the vehicle is twenty miles per hour when the brake is depressed, the signal will operate at great frequency, but as the speed of the vehicle decreases, the frequency of operation of the signal also decreases.

Many minor changes in detail of construction may be resorted to without departure from the spirit of the invention.

Having thus described my invention what I claim and desire to secure by Letters Patent of the United States is:

1. A switch mechanism adapted to be interposed between a vehicle transmission casing and the adjacent end of a speedometer shaft comprising a hollow body member, a cam link operable therein forming a continuation of the speedometer shaft, a circuit maker and breaker supported on said body member, and means for moving said circuit maker and breaker into and out of operative association with said cam link.

2. A switch mechanism comprising a hollow body member, a cam link rotatably mounted therein, a circuit maker and breaker supported on said body member and adapted to be operated by said cam link, and a resiliently tensioned cam lever adapted to open said circuit maker and breaker and hold the same out of operative association with said cam link.

3. A switch mechanism adapted to be interposed between a vehicle transmission casing and the adjacent end of a speedometer shaft comprising a hollow body member mounted on the transmission casing of an automobile, a cam link rotatably mounted therein and forming a continuation of the speedometer shaft, a switch body supported on said body member, spaced contact points in said switch body, a slidably mounted contact interposed between said first mentioned contacts, means adjacent said slidable contact adapted to cooperate with said cam link for intermittently opening and closing the several contacts, and a resiliently tensioned cam lever for selectively holding said slidable contact out of operative association with said cam link.

4. A switch mechanism adapted to be positioned between the transmission casing and the adjacent end of the speedometer shaft of a motor vehicle comprising a cam link operatively connected between said speedometer shaft and the gears in said transmission casing, a circuit maker and breaker adapted to be intermittently operated by said cam link, whereby a visual or audible signal may be intermittently operated, and means associated with said circuit maker and breaker to hold the same in inoperative relation with said cam link when said vehicle is running unbraked.

In testimony whereof I affix my signature.

HARRY L. FURR.